United States Patent
Rautiainen et al.

(10) Patent No.: US 6,720,823 B1
(45) Date of Patent: Apr. 13, 2004

(54) REGISTER RECALL IN A WILL SYSTEM

(75) Inventors: Jaakko Rautiainen, Oulu (FI); Jussi Sarpola, Oulu (FI); Timo Kononen, Tyrnävä (FI)

(73) Assignee: Nokia Corporation, Espoo (FI)

(*) Notice: Subject to any disclaimer, the term of this patent is extended or adjusted under 35 U.S.C. 154(b) by 804 days.

(21) Appl. No.: 09/611,406

(22) Filed: Jul. 6, 2000

Related U.S. Application Data

(63) Continuation of application No. PCT/FI99/00011, filed on Jan. 8, 1999.

(30) Foreign Application Priority Data

Jan. 9, 1998 (FI) .................................................. 980037

(51) Int. Cl.⁷ ........................ H04M 3/00; H04M 15/00; H04M 7/20; H04H 1/00
(52) U.S. Cl. .................... 329/242; 379/111; 455/426.2; 455/3.01
(58) Field of Search ................................ 379/242, 111, 379/201.01; 455/404.1, 3.01, 426.2

(56) References Cited

U.S. PATENT DOCUMENTS

| | | | |
|---|---|---|---|
| 5,933,786 A | 8/1999 | Sarpola et al. ............... | 455/560 |
| 6,185,412 B1 * | 2/2001 | Pentikainen et al. ..... | 455/404.1 |
| 6,301,475 B1 * | 10/2001 | Saarela et al. ............... | 370/350 |
| 6,324,281 B1 * | 11/2001 | Liinamaa et al. ........... | 379/242 |
| 6,434,377 B1 * | 8/2002 | Penttinen .................. | 455/404.1 |

FOREIGN PATENT DOCUMENTS

| | | |
|---|---|---|
| WO | 95/24103 | 9/1995 |
| WO | WO 95/24103 | 9/1995 |
| WO | 96/08937 | 3/1996 |
| WO | 96/15638 | 5/1996 |

OTHER PUBLICATIONS

ETS 300 347-1 "Signalling Protocols and Switching (SPS); V interfaces at the digital Local Exchange (LE) V5.2 interface for the support of Access Network (AN) Part 1: V5.2 interface specification".
ETS 300 324-1 "Signalling Protocols and Switching (SPS); V interfaces at the digital Local Exchange (LE) V5.1 interface for the support of Access Network (AN) Part 1: V5.1 interface specification".
International Search Report for PCT/FI99/00011.
ETS 300 940, "Digital cellular telecommunications system (Phase 2+); Mobile radio interface layer 3 specification (GSM 04.08 Version 5.10.1)", *The GSM System for Mobile Communications*, 3 pgs., Dec. 1998.

* cited by examiner

*Primary Examiner*—Ahmad F. Matar
*Assistant Examiner*—Hector Agdeppa
(74) *Attorney, Agent, or Firm*—Squire, Sanders & Dempsey L.L.P.

(57) ABSTRACT

A telecommunication system for a register recall, said system comprising a local exchange (LE), an access node (AN) connected to the local exchange via a V5 interface, a wireless link system connected to the access node, and terminal equipment (MS) connected via the wireless link system to the access node. According to the invention, the system comprises elements (MS, AN) by means of which a request to set a current call into hold state is sent from the terminal equipment to the access node, a response message rejecting the request to set the current call into hold state is sent from the access node to the terminal equipment and a register recall request is sent from the access node to the local exchange.

6 Claims, 1 Drawing Sheet

REGISTER RECALL IN A WILL SYSTEM

Figure 1:
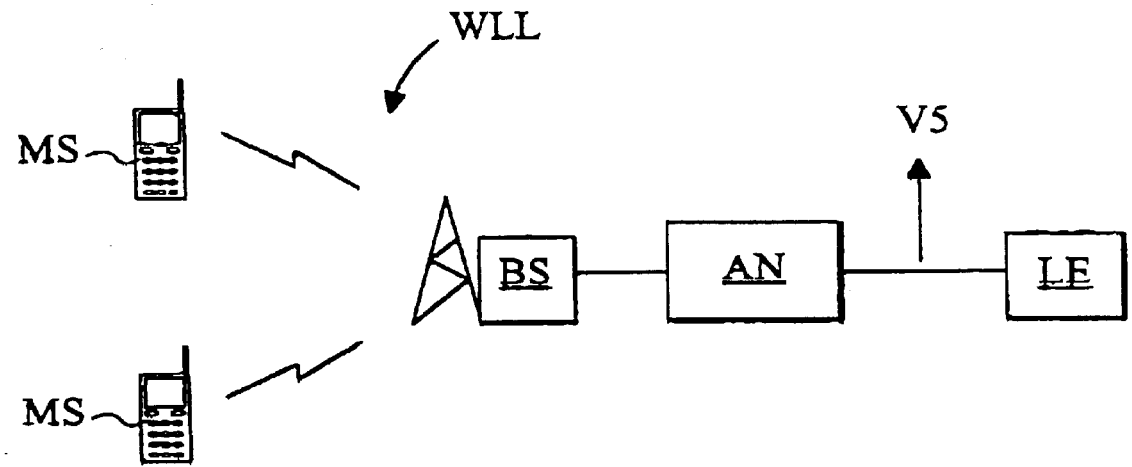

This application is s continuation of PCT/FI99/0011 filed Jan. 8, 1999.

The present invention relates to a telecommunication system for register recall as defined in the preamble of claim 1, where the telecommunication system is e.g. a WLL system.

WLL system (WLL, Wireless Local Loop) refers to a system in which a subscriber is connected to a telephone network via a wireless link system. The subscriber interface is achieved using special terminal equipment. In principle, the terminal equipment functions like a known mobile telephone, but it can be assigned a limited mobility area within which it can function. To implement the wireless link system, mobile communication technology, e.g. GSM technology (GSM, Global System for Mobile Communications) can be applied.

Open interfaces (V5.1 and V5.2) between an access node and a local exchange are defined in ETSI (European Telecommunications and Standards Institute) standards of the ETS 300 324 and ETS 300 347 series. V5 interfaces enable subscribers belonging to a physically separate access network, either wired or wireless, to be connected using the standard interface of the telephone exchange. The V5.2 interface supports analogue telephones as used in the public telephone network, digital subscriptions, such as ISDN (Integrated Services Digital Network) basic and system subscriptions as well as other analogue or digital terminal equipment based on semi-fixed connections.

In a WLL system, the subscriber's terminal equipment may consist of a portable mobile station. The GSM network contains no function that could be used to activate register recall. A register is a device in the exchange that receives the numbers dialled by the subscriber and controls the subsequent connecting functions. Register recall means that the subscriber reserves the register again during a call to use a function. In an analogue system, register recall is typically effected by pressing the R or Recall key or equivalent. In the digital GSM mobile communication system, this function does not exist. When a WLL system is connected to the public telephone network via a V5 interface and the subscriber port type in the V5 interface is analogue subscriber, register recall cannot be activated if the terminal equipment used is a digital mobile station, especially when the terminal equipment used is a normal mobile station in a digital mobile communication network. e.g. the GSM network.

The object of the present invention is to disclose a new type of system that can be used to eliminate the above-mentioned drawback. A specific object of the invention is to achieve a system that allows the utilisation of analogue network services using digital terminal equipment, especially a normal mobile station in a digital mobile communication network, e.g. the GSM network.

As for the features characteristic of the present invention, reference is made to the claims.

The system of the invention comprises a local exchange and an access node connected to the local exchange via a V5 interface. Connected to the access node is a wireless link system and further via the wireless link system a terminal device.

The system of the invention comprises elements by means of which a request to set the current call into hold state is sent from the terminal equipment to the access node. The access node sends the terminal equipment a response message rejecting the request. The access node sends a register recall request to the local exchange via the V5 interface.

In a preferred embodiment of the invention, the request from the terminal equipment to the access node to set the current call into hold state is sent as a HOLD message consistent with the wireless link system. The HOLD message is described in GSM standard 04.08.

In a preferred embodiment of the invention, the access node resects the request from the terminal equipment to hold the current call by sending a HOLD REJECT response message consistent with the wireless link system. The HOLD REJECT message is described in GSM standard 04.08.

In a preferred embodiment of the invention, the request from the access node to the local exchange is sent as a SIGNAL message consistent with the wireless link system. Preferably the Pulsed-signal information element of the SIGNAL message has the value Register recall. The SIGNAL message is described in ETSI standard ETS 300 324-1.

In a preferred embodiment of the invention, the wireless link system used is based on a digital mobile communication system, preferably the GSM system.

The invention provides the advantage that it allows the users of portable terminal equipment to use analogue network subscriber functions as transparently as possible. A further advantage is that it makes it possible to use portable terminal equipment of the public GSM network in a WLL system.

Figure 2:
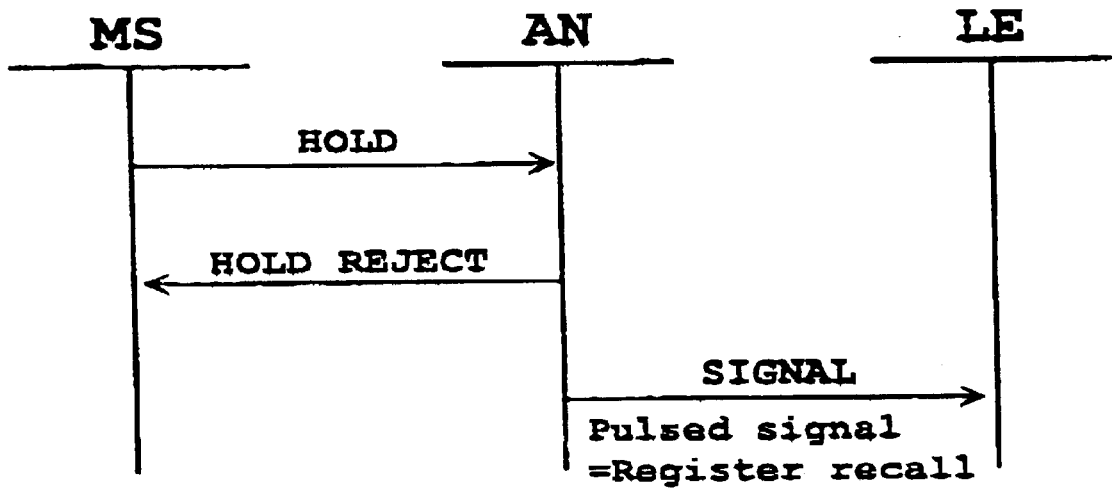

In the following, the invention will be described by the aid of a few examples of its embodiments by referring to the attached drawing, wherein FIG. 1 presents a WLL system, according to the invention, and FIG. 2 represents signalling according to the invention.

FIG. 1 shows a wireless local loop WLL, in which the subscriber terminals MS are connected via a radio link to a base station BS and through it to an access node AN. In this example, both the subscriber terminals MS and the base station BS are based on the GSM system. From the access node, the subscribers are connected to a wired-network local exchange LE via a V5 interface consistent with the ETS 300 347-1 standard.

FIG. 2 illustrates a preferred signalling procedure for implementing the system of the invention. In this example, the call waiting function has been activated for the subscription. When the subscriber hears a call waiting tone during a call, which is a sign of another incoming call, the subscriber may answer the incoming call while holding the current call. In this case, the subscriber must activate the register recall function.

When the terminal equipment MS is a portable mobile station, the subscriber activates the HOLD function via his/her terminal equipment. The HOLD message is transmitted to the access node AN, which rejects the function and sends a HOLD REJECT message to the subscriber terminal. Next, the access node sends to the local exchange LE a SIGNAL message via the V5 interface. The register recall data is sent in the Pulsed signal information element of the SIGNAL message. Register recall has now been effected.

The local exchange transmits to the terminal equipment a dial tone, whereupon the subscriber dials e.g. the number 2, which puts the old call to the background and activates the new call. In other words, the subscriber's current call has been set into hold state and the waiting call is connected to the subscriber.

The invention is not restricted to the examples of its embodiments described above, but instead many variations are possible within the framework of the inventive idea defined by the claims.

What is claimed is:

1. Telecommunication system for register recall, said system comprising a local exchange (LE), an access node (AN) connected to the local exchange via a V5 interface, a wireless link system connected to the access node, and terminal equipment (MS) connected via the wireless link system to the access node, characterised in that the system comprises elements (MS, AN) by means of which a request to set a current call into hold state is sent from the terminal equipment to the access node a response message rejecting the request to set the current call into hold state is sent from the access node to the terminal equipment, and a register recall request is sent from the access node to the local exchange.

2. System as defined in claim 1, characterised in that, to set the current call into hold state, a HOLD message consistent with the wireless link system is sent from the terminal equipment to the access node.

3. System as defined in claim 1, characterised in that a HOLD REJECT response message consistent with the wireless link system is sent from the access node to the terminal equipment, thereby rejecting the request to set the current call into hold state.

4. System as defined in claim 1, characterised in that a SIGNAL message consistent with the wireless link system is sent from the access node to the local exchange to set the current call into hold state.

5. System as defined in claim 1, characterised in that the Pulsed-signal information element of the SIGNAL message has the value Register recall.

6. System as defined in any one of claim 1, characterised in that the wireless link system is based on the GSM system.

* * * * *

UNITED STATES PATENT AND TRADEMARK OFFICE
CERTIFICATE OF CORRECTION

PATENT NO.     : 6,720,823 B1
DATED          : April 13, 2004
INVENTOR(S)    : Rautiainen et al.

It is certified that error appears in the above-identified patent and that said Letters Patent is hereby corrected as shown below:

<u>Title page,</u>
Item [54], Title should read -- REGISTER RECALL IN A WLL SYSTEM --.

Signed and Sealed this

Eighth Day of June, 2004

JON W. DUDAS
*Acting Director of the United States Patent and Trademark Office*